(No Model.)
J. V. STOUT.
MECHANISM FOR OPERATING DAMPERS OR SIMILAR VALVES.
No. 459,091. Patented Sept. 8, 1891.
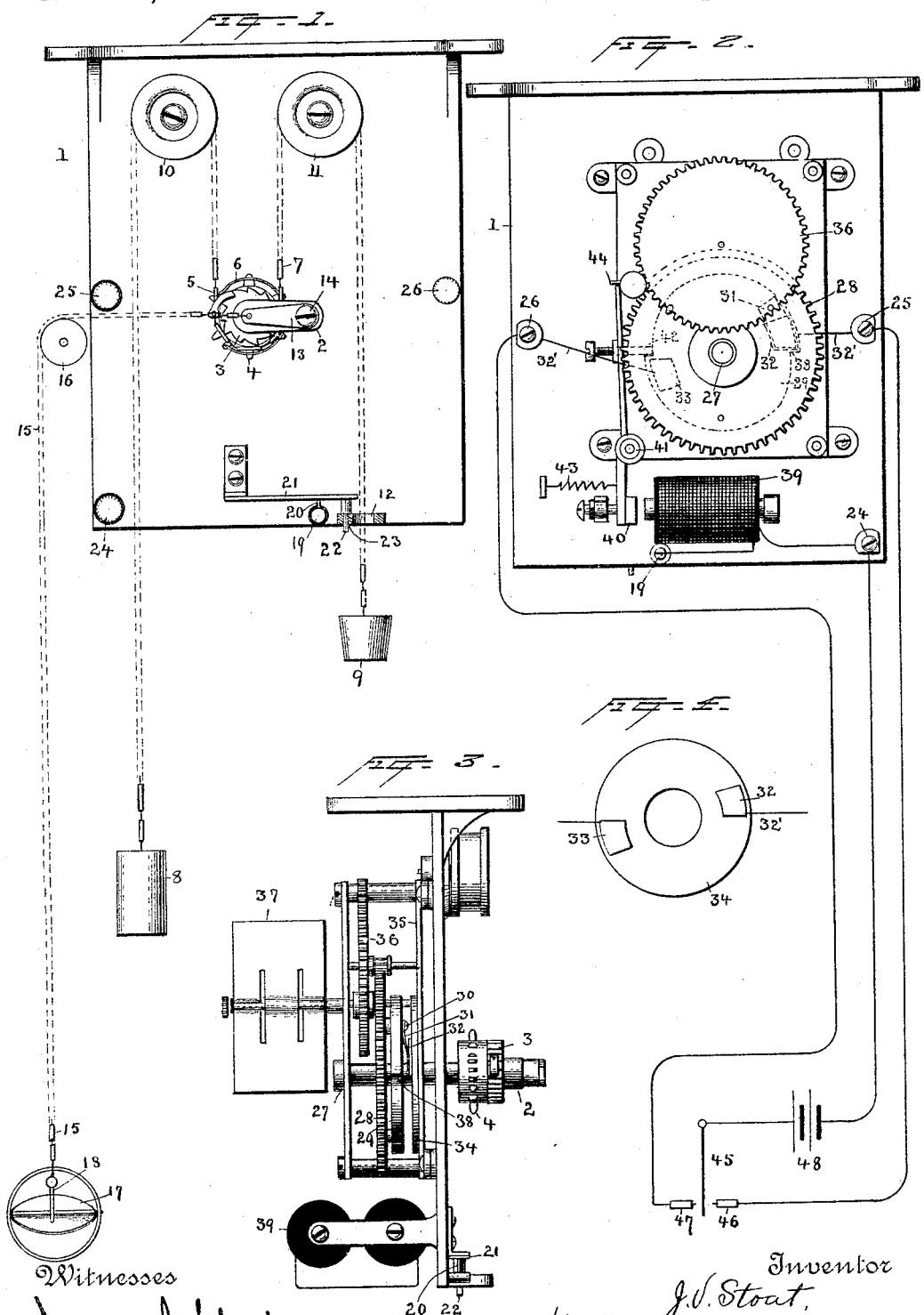

UNITED STATES PATENT OFFICE.

JOHN V. STOUT, OF EASTON, PENNSYLVANIA.

MECHANISM FOR OPERATING DAMPERS OR SIMILAR VALVES.

SPECIFICATION forming part of Letters Patent No. 459,091, dated September 8, 1891.

Application filed March 9, 1891. Serial No. 384,231. (No model.)

*To all whom it may concern:*

Be it known that I, JOHN V. STOUT, a citizen of the United States, residing at Easton, in the county of Northampton and State of Pennsylvania, have invented a certain new and useful Improvement in Mechanism for Operating Dampers or Similar Valves, of which the following is a specification.

The present invention relates to mechanism for opening and closing dampers of furnaces, the improved means being controlled by a magnet in a thermostatic circuit in a well-known manner.

The object of the invention is to provide a simple and efficient clock-work mechanism for accomplishing the object named; and the invention consists in the several features and combinations hereinafter set forth.

In the accompanying drawings, Figure 1 is a face view of the mechanism; Fig. 2, a rear view, the regulating-fan and back plate of the clock-work being omitted. Fig. 3 is a view at right angles to Fig. 1, the chain and weights being omitted; and Fig. 4 is a detail of circuit contacts.

At the center of the front plate 1 is a spindle carrying a crank-arm 2, a ratchet-wheel 3, and a sprocket or friction wheel 4, the crank-arm and ratchet-wheel being rigidly connected to the spindle, and the sprocket-wheel being connected therewith by means of the pawl 5, carried by the sprocket-wheel and engaging with the teeth of the ratchet-wheel, said pawl being pressed forward by spring 6. The ratchet allows the sprocket-wheel to turn from right to left independently of the spindle. Engaging with the teeth of the sprocket-wheel is a belt or chain 7, which carries two weights 8 9, the former being heavier than the latter to drive the clock-work and move the valve. The chain passes from weight 8 over pulley 10, around the sprocket-wheel, over pulley 11, through an eye or guide 12 to weight 9. Connected to the crank-arm, preferably through a second arm 13, adapted to turn on the pin 14, is a chain or cord 15, passing over a pulley 16 to the damper to be controlled. Such a damper is indicated on a smaller scale than the mechanism already described at 17. This damper has a horizontal axis and is provided with an arm 18, having at is outer end a weight. The arm is connected to the valve about midway between the axis and upper edge of the valve, and is so arranged that the weight will tend to close the valve when it is opened— that is, the arm 18 is so mounted that the weight will be at one side of the perpendicular line when the damper is opened. The chain or cord 15 is connected to the arm 13.

19 is an insulated post carrying a contact 20, against which the spring 21, which is in metallic contact with the front plate 1, normally bears. A pin 22 projects from the spring through an eye or socket 23. 24 25 26 are insulated binding-posts on plate 1.

Referring to Figs. 2 and 3, 27 is the central spindle which carries the crank-arm 2. On said spindle are a gear-wheel 28 and an insulating disk or plate 29, the latter being shown in dotted lines in Fig. 2, since it is behind the wheel 28. Said wheel and plate are connected so that they move together by screws or rivets 30, and to one of these screws is connected a contact-spring 31, which is adapted to bear alternately on the contact-plates 32 33, carried by an insulated plate 34, which is held on the back plate 35 of the clock-work mechanism.

32 33 are connected by wire 32' to the insulated binding posts 25 26, respectively. The wheel 28 is geared with a pinion on the shaft of the wheel 36, which in turn drives the retarding device or regulating-fan 37. The insulating-disk 29 has two cam-shaped segments, as shown, whereby two depressions or notches 38 are formed in its periphery.

39 is an electro-magnet having an armature 40, pivoted at 41 and carrying a detent-screw 42, the end of which is adapted to rest alternately in the depressions 38. The armature-lever is provided with a retracting-spring 43.

44 is a pin on the shaft of the fan-regulator, which pin rests on the top of the armature-lever when it is in position to stop the mechanism. A dust-tight case is usually placed over the mechanism, but this is not shown.

45 is a thermostatic bar or circuit-controller of any suitable construction adapted to make contact with the terminals 46 and 47 as the temperature falls or rises in the apartment to be regulated.

48 is a generator in the thermostatic circuit.

The operation of the apparatus described is as follows: Suppose that the check-damper in Fig. 1 is open and the temperature at the locality of the thermostat has fallen so that the thermostatic bar moves against terminal 46, closing the following circuit: battery 48, bar 45, terminal 46, binding-post 25, wire 32', contact 32, spring 31, wheel 28, base-plate 1, spring 21, post 19, magnet 39, post 24, and back to the opposite pole of the battery. This energizes the magnet, moving its armature, withdrawing screw or detent 42, and allowing the weight 8 to turn the mechanism, thereby carrying arm 2 toward the left and allowing the weight on the valve to close the same. When the spindle has made a half-revolution, the screw 42, which rides over the periphery of the disk 29, falls into the opposite depression 38 and stops further revolution. The check-damper being closed, the fire will burn more freely and the temperatures at the locality of the thermostat will rise, and when it has reached a certain limit will close the thermostatic circuit on the opposite side—that is, against terminal 47, closing the circuit as follows: Battery 48, bar 45, terminal 47, binding-post 26, wire 32', to contact 33, to spring 31, base-plate of the mechanism, spring 21, post 19, magnet 39, back to the opposite pole of the battery. This again liberates the mechanism which turns another half-revolution and opens the valve. Since the only work required of the battery is to operate the detent, a weak battery may be employed. It will be seen that the battery is always on open circuit, except for a moment while it is doing its work, irrespective of the length of time which the thermostatic bar rests against one of the terminals, since the circuit will be broken between the contacts 32 or 33 and the spring 31. When the weight 8 has moved down as far as the length of the chain will allow, the small weight 9 presses against the pin 22, raising spring 21 from contact 20, so that it is impossible to close the circuit until the weight 8 has been again raised. When the weight is thus raised, the chain turns the sprocket-wheel 4 from right to left without moving the rest of the clock-work mechanism, as will be evident.

Having thus described the invention, what I claim is—

1. The combination, with a valve or damper, of means for opening and closing the damper, consisting of a spindle carrying a sprocket-wheel, a weighted chain for turning said wheel and spindle, a wheel on the spindle, an insulating-disk also on the spindle and carrying a circuit making and breaking spring or contact and moving with the wheel, and a detent controlled by a magnet in the thermostatic circuit for said mechanism, substantially as described.

2. The combination, with a valve or damper, of means for opening and closing the damper, consisting of a spindle carrying a sprocket-wheel, a weighted chain for turning said wheel and spindle, a wheel directly on the spindle, a retarding device therefor, an insulating-disk moving with said wheel, a contact-spring moving with the wheel and in electrical contact therewith, contacts opposite each other and in the path of movement of said spring and connected to the thermostatic circuit, and a detent controlled by a magnet in the same thermostatic circuit, substantially as described.

3. The combination of a spindle, a sprocket-wheel thereon, two pulleys above the sprocket-wheel, a chain passing over said pulleys and around or under the sprocket-wheel, said chain being weighted, and a circuit-breaker in the path of one of the weights, said circuit-breaker being in a circuit controlling a detent for the mechanism, substantially as described.

This specification signed and witnessed this 3d day of March, 1891.

JOHN V. STOUT.

Witnesses:
CHARLES M. CATLIN,
GEO. W. BARNETT.